June 17, 1924.
L. COATALEN ET AL
1,498,353
FRICTION CLUTCH
Filed Nov. 5, 1923
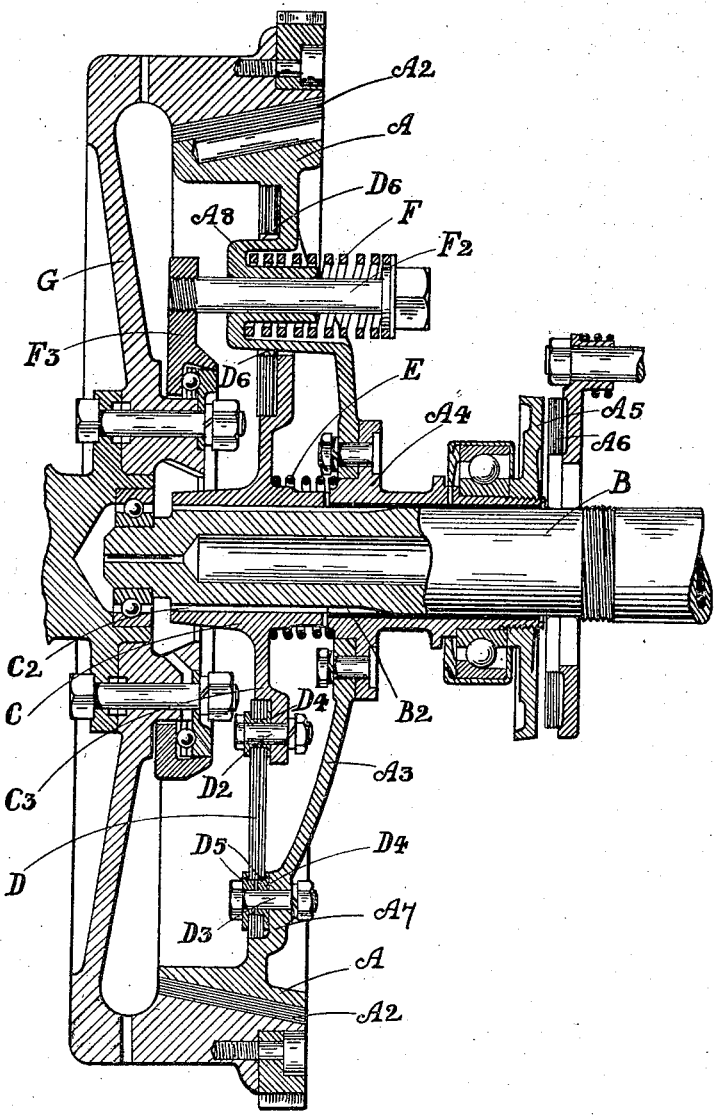
INVENTORS:
Louis Coatalen,
Herbert C. MacLeod Stevens
PER
Spear, Middleton, Donaldson, Hall.
ATTORNEY Patented June 17, 1924.

1,498,353

UNITED STATES PATENT OFFICE.

LOUIS COATALEN AND HERBERT CHARLES MACLEOD STEVENS, OF WOLVERHAMPTON, ENGLAND, ASSIGNORS TO SUNBEAM MOTOR CAR COMPANY LIMITED, OF WOLVERHAMPTON, ENGLAND, A BRITISH COMPANY.

FRICTION CLUTCH.

Application filed November 5, 1923. Serial No. 672,941.

*To all whom it may concern:*

Be it known that we, LOUIS COATALEN and HERBERT CHARLES MACLEOD STEVENS, both subjects of the King of England, residing at Wolverhampton, in the county of Staffordshire, England, have invented certain new and useful Improvements in Friction Clutches, of which the following is a specification.

This invention relates to cone friction transmission clutches, of the kind in which the supporting means and the transmission means for the axially movable friction element are separate from one another, the former providing for it axial and independent rotational freedom, while the drive is transmitted to the clutch shaft or equivalent through a flexible disc or other device which allows the necessary axial movement for engagement and disengagement of the clutch element.

In a known construction the rim of the friction element is rigidly attached to a hub which is rotationally and endwise free upon the clutch shaft, and a flexible disc connects the rim of the clutch with a second hub which is both endwise and angularly fast upon the clutch shaft. Such an arrangement, however, may cause undesirable stresses in the flexible material and also limit the axial movement of the rim, and under certain circumstances this latter effect is very undesirable, as for instance in a motor vehicle where in changing gear the clutch must be movable sufficiently to engage a stop. The principal object, therefore, of the present invention is to provide for such extended axial movement without at the same time causing any binding action when freeing the clutch.

According to this invention, the hub to which the flexible transmission device is attached is axially free upon the clutch shaft or equivalent, while remaining, however, rotationally fast with it, and thus the flexible device offers no impediment to the extended axial movement of the clutch, while at the same time retaining the advantage of allowing disengagement without producing binding effects. Furthermore it relieves the flexible material of lateral stress, whether the clutch is engaged or disengaged, as the hub to which it is attached can move with it in the axial direction.

The hub carrying the flexible device is preferably splined upon the clutch shaft and any tendency of the splined hub to bind upon the shaft during axial movement of the clutch is avoided by the foregoing arrangement, while the full effect of the clutch spring is conveyed to the clutch surfaces without loss through the resistance caused by binding of the splines which obviously is greatest when the drive is transmitted through them.

The accompanying drawing illustrates by an axial section of the clutch a method of carrying out the invention, which is suitable for use in various kinds of machinery, but is particularly intended for use upon motor vehicles. The sliding clutch member comprises a coned rim A on which the clutch surfaces $A^2$ are provided, and this rim is supported by a disc $A^3$, which is dished somewhat and at its centre part is attached to a sleeve or hub $A^4$ rotatably and endwise free upon the clutch shaft B. This hub is provided with the usual clutch brake device $A^5$ to bear on the stationary surface $A^6$ and with clutch actuating mechanism, not shown, whereby the clutch may be engaged and disengaged.

A second hub portion C is provided which is arranged upon the clutch shaft B adjacent to the first mentioned hub $A^4$ and is provided with splines $C^2$ or equivalent means for establishing a driving connection with splines $B^2$ on the shaft B which will allow also for its axial movement. Around this hub is a radial flange $C^3$, and between this flange and the rim A of the clutch is located an annular disc D of resilient material, such as leather, rubberized canvas, or the like, the inner and outer peripheries of this disc being bolted respectively at $D^2$ to the flange $C^3$ of the splined hub C, and at $D^3$ to a suitably prepared portion $A^7$ of the disc $A^3$ of the clutch, where it connects to a rim A. The bolts employed to secure the flexible disc to the rim and to the hub may extend through flanged bushes $D^4$ provided in the flexible disc, the bushes being formed in pairs and so arranged that tightening up the nuts draws their flanges $D^5$ together so that they grip the resilient material of the disc D and distribute the stress thereby.

A compression spring E may be provided between the two hub parts $A^4$ and C of the clutch so that the normal tendency is for them to be thrust apart from one another.

Any convenient arrangement of clutch engaging spring may be employed, and preferably in the known manner a number of compression springs F are spaced around the clutch disc $A^3$ and are loaded by bolts $F^2$ anchored to a rotatably mounted spider $F^3$ carried by the co-operating member G of the clutch, suitable apertures $D^6$ being provided in the flexible disc for spring containing pockets $A^8$ provided upon the clutch disc $A^3$.

It will be seen that the invention thus provides for the effective driving of the clutch through a flexible and resilient member so that any tendency to bind at the splined driving portions offers no opposition to the engagement or disengagement of the clutch. Thus there is no irregularity in effecting the engagement, and the tendency of the clutch to slip through such a defect is avoided, while at the same time a smoother drive is obtainable owing to the resilience of the flexible member.

What we claim as our invention and desire to secure by Letters Patent of the United States is:—

1. In a cone friction clutch, the combination of a non-slidable element, a slidable element adapted to engage frictionally therewith, a shaft in permanent engagement with said slidable element supporting it rotationally and endwise free when engaged and disengaged, means for thrusting said slidable element into engagement with said non-slidable element, means for withdrawing it therefrom, a hub angularly fast but slidable upon the aforesaid shaft, and a member connecting said slidable element with said hub adapted to transmit the drive and flexible in the axial direction of the clutch, substantially as set forth.

2. In a cone friction clutch, a non-slidable friction element, a shaft adapted to be clutched thereto, a slidable element supported rotatably and endwise free upon said shaft, a hub mounted angularly fast but endwise free upon said shaft, a flexible annular disc connecting with its inner and outer peripheries respectively, said hub and said slidable element, and a compression spring around said shaft located between said hub and said slidable element, substantially as set forth.

In testimony whereof we have signed our names to this specification in the presence of two subscribing witnesses.

LOUIS COATALEN.

Witnesses:
  W. W. ILIFF,
  CHARLES N. WRIGHT.

HERBERT CHARLES MACLEOD STEVENS.

Witnesses:
  EDWARD DEANESLY,
  ALFRED HUGGINS.